W. J. RUDOLPH.
QUICK ACTING HIGH PRESSURE CONNECTION.
APPLICATION FILED JAN. 24, 1920.
1,393,908. Patented Oct. 18, 1921.
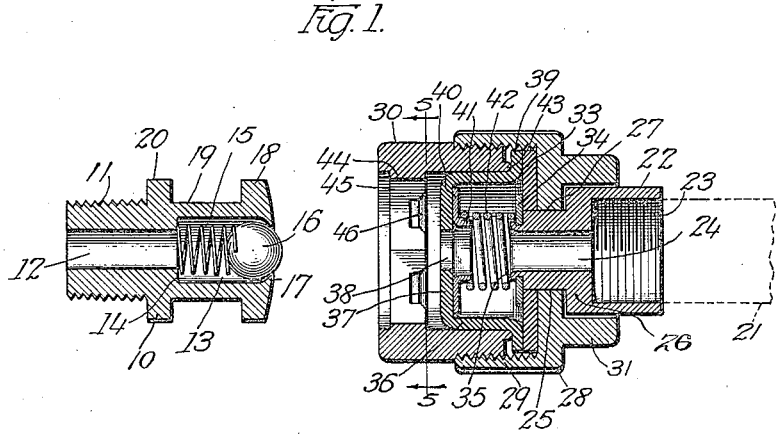
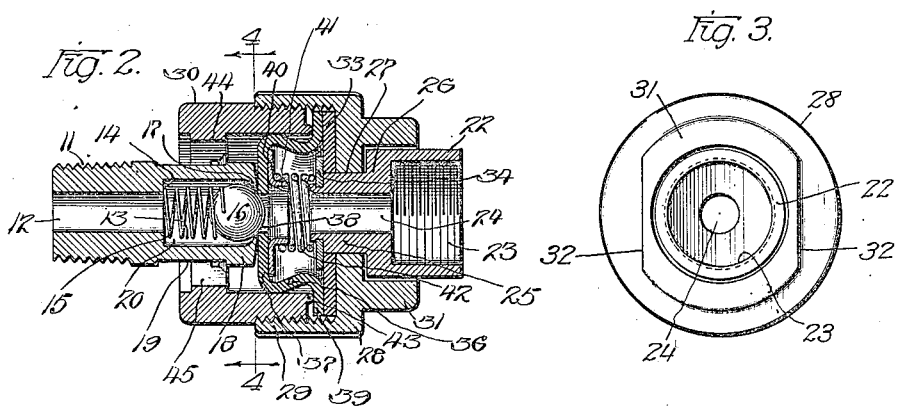
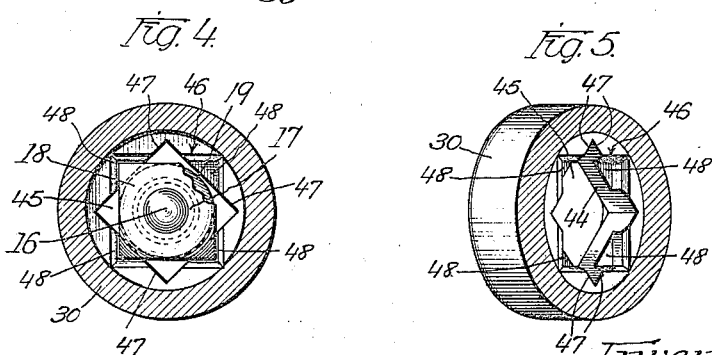
Inventor:
Walter J. Rudolph,
by John Howard McElroy his Atty.

UNITED STATES PATENT OFFICE.

WALTER J. RUDOLPH, OF CHICAGO, ILLINOIS, ASSIGNOR TO THE IMPERIAL BRASS MANUFACTURING COMPANY, OF CHICAGO, ILLINOIS, A CORPORATION OF ILLINOIS.

QUICK-ACTING HIGH-PRESSURE CONNECTION.

1,393,908.   Specification of Letters Patent.   Patented Oct. 18, 1921.

Application filed January 24, 1920. Serial No. 353,795.

*To all whom it may concern:*

Be it known that I, WALTER J. RUDOLPH, a citizen of the United States, and a resident of Chicago, in the county of Cook and State of Illinois, have invented certain new and useful Improvements in Quick-Acting High-Pressure Connections, of which the following is a full, clear, and exact specification.

My invention is concerned with quick acting high pressure connections, such for instance as are employed to connect the end of grease gun tubes with bearings and is designed to produce such a connection that will be simple in its construction, efficient in operation, and that can be cheaply manufactured.

To these ends, it consists of a novel construction hereinafter fully described, and the novel features and combinations thereof particularly pointed out in the claims.

To illustrate my invention, I have annexed hereto a sheet of drawings of which—

Figure 1 is a central longitudinal section of the connections with the bearing nipple separate from the coupling head;

Fig. 2 is a similar view with the bearing nipple in place in process of being positioned and before it is finally locked in place;

Fig. 3 is an end elevation of the same seen from the right hand end of Fig. 2;

Fig. 4 is a vertical section seen on the line 4—4 of Fig. 2; and

Fig. 5 is a perspective view seen as if on the line 5—5 of Fig. 1.

The bearing nipple 10 is preferably formed from a piece of square rod and has the threaded end 11 adapted to be screwed into the bearing which is to be lubricated, and where it remains permanently. Extending through the nipple is the passage 12 for the grease, which has an enlarged portion 13 connected by the annular shoulder 14 with the smaller portion, which shoulder serves as an abutment for one end of the light helically coiled expanding spring 15, the other end of which coöperates with the ball check valve 16 which engages the valve seat 17 formed at the outer end of the passage through the nipple. The nipple is provided with a locking head 18, which, where it is made from a square rod is preferably left square in cross-section, and a reduced neck portion 19 is formed by turning down the rod to a circular form between the head 18 and the flange 20.

A tube 21, indicated in dotted lines in Fig. 1, is adapted to be connected with the grease gun, and terminates in a discharge nipple 22 to which it may be connected in any convenient manner, as by being screwed into the internally threaded portion 23 of the discharge nipple. This nipple is provided with the reduced passage 24, preferably of the same size as the reduced portion of the passage 12 in the bearing nipple, and it has the reduced portion 25 connected by the annular flange 26 with the main portion 22. This reduced portion 25 extends through and is adapted to turn in an aperture 27 formed in the bottom of the coupling head back piece 28, which back piece has the forwardly extending and internally threaded portion 29 into which is screwed the externally threaded end of the coupling head front piece 30. The periphery of the flange 29 is preferably knurled or otherwise roughened, and the outwardly projecting flange 31, which receives the body of the discharge nipple 22 preferably has two of its sides cut off as seen at 32 so as to form a bearing for a wrench. Seated in the bottom of the coupling or back piece 28 is a leather washer 33, having a central aperture through which the portion 25 of the discharge nipple passes. A small metal washer 34 is held against the leather washer 33 by slightly swaging the reduced end 35 of the discharge nipple, which reduced end extends through the aperture of the washer 34. With this construction, it will be seen that the discharge nipple is free to turn in the coupling head.

To form an elastic packing member in the coupling head, I employ the cup 36, preferably composed of leather, and having the central disk-shaped portion 37 having an aperture 38 centrally located therein and adapted to register with the check valve ball 16. An annular flange 39 is parallel to the central portion 37 and is connected thereto by the main portion lettered 36. A metallic washer 40 preferably formed with an inwardly projecting flange 41 about its central aperture backs up the central portion 37 which is normally held in the extended position seen in Fig. 1 by the helically coiled expanding spring 42 interposed between the washers 34 and 40 and held in place by the flange 31 and the end 35 of the discharge nipple. The cup 36 is held firmly in place to make a tight joint by the inner end of the coupling head front piece engaging therewith as the front piece is screwed into the back piece. This inner end is preferably formed with a small rib 43 which is adapted to bite into the leather of the flange 39 more effectively than would the unreduced end of the coupling head front piece 30.

To lock the bearing nipple into the coupling head, I employ the mechanism to be described, which consists of a web 44 in the outer end of the coupling head front piece, which web 44 contains a square aperture 45 of a size just sufficient to readily permit the head 18 of the bearing nipple to pass through it. On the interior of the coupling head, just back of web 44, is formed the locking section 46, best shown in perspective in Fig. 5, which is preferably integral with the web 44, and has an opening therein with the four angles 47 which are of the proper size and shape to register with the angles of the aperture 45. In addition to these angles 47, I form in the inner edge of the section the four equidistant angles 48, which are intermediate of the angles 47 and of the same size and distance from the edges, so that when the head 18 is introduced through the aperture 45, as seen in full lines in Fig. 2, its corners will pass through the angles 47, and if it then be turned through an angle of 45 degrees and released, the spring 42 will force it back and seat it with its corners in the angles 48. To facilitate this automatic seating action, I preferably bevel off the edges of the recesses 48, as best seen in Fig. 5, so that the nipple is automatically and readily forced back to the dotted line position shown in Fig. 2.

When the grease is forced in the nipple 22, the high pressure causes it to force the leather cup outward against the walls of the front piece, and thus further pressure necessarily opens the valve 16, and permits the passage of the grease from the nipple 22 into the nipple 10 without any loss.

The operation of the connection thus described will be readily apparent, and it will be obvious that they can be quickly attached and detached, and I have found by trial that they will stand without any leakage the high pressure to which such devices are subjected.

While I have shown and described my invention as embodied in the form which I at present consider best adapted to carry out its purposes, it will be understood that it is capable of some modification, and that I do not desire to be limited in the interpretation of the following claims except as may be necessitated by the state of the prior art.

What I claim as new, and desire to secure by Letters Patent of the United States, is—

1. In quick acting high pressure connections, the combination with a nipple having a head and neck portion with a passage therethrough, said head being polygonal in its cross-section and having a valve seat in the outer end of the passage therethrough, a valve coöperating with the said seat, and a spring holding it in position; of a coupling head having a nipple receiving aperture corresponding in shape to the cross-section of the head, and an elastic packing member in said coupling head having an aperture adapted to register with the valve, said coupling head being provided with a seat for said nipple head with which it registers when it has been introduced and turned and into which it is forced by the elastic packing member.

2. In quick acting high pressure connections, the combination with a nipple having a square head and a neck portion with a passage therethrough, having a valve seat in the outer end of the passage, a valve coöperating therewith, and a spring closing it, of a coupling head having a square nipple receiving aperture, an elastic packing member in said coupling head having an aperture adapted to register with the valve, and a locking seat member having four angular recesses registering with the angles of the aperture and four intermediate angular recesses with which the corners of the head register when it has been introduced and turned and into which it is forced by the elastic packing member.

3. In quick acting high pressure connections, the combination with a nipple having a square head and a neck portion with a passage therethrough, having a valve seat in the outer end of the passage, a valve coöperating therewith, and a spring closing it, of a coupling head having a square nipple receiving aperture, an elastic packing member in said coupling head having an aperture adapted to register with the valve, and a locking seat member having four angular recesses registering with the angles of the aperture and four intermediate angular recesses with which the corners of the head register when it has been introduced and turned and into which it is forced by the elastic packing member, said intermediate recesses having their sides beveled for the purpose described.

4. In quick acting high pressure connections, the combination with a nipple having a passage therethrough closed by a spring pressed valve and a locking member, of a coupling head with an aperture to receive the nipple and a coöperating locking member, an elastic packing member consisting of a flexible cup having a central disk portion with an aperture therein registering with the nipple passage, an outer annulus for securing the cup in place and a connecting annulus, and a spring within the cup tending to force the disk portion into engagement with the nipple.

5. In quick acting high pressure connections, the combination with a coupling head back piece having a discharge nipple entering therethrough and having an inwardly threaded forwardly extending annular flange, of a cylindrical coupling head front piece threaded into the back piece, and an elastic packing member consisting of a flexible cup member with a central aperture therein, the cylindrical body portion and the annular flange squeezed between the inner edge of the front piece and the back of the back piece, and a spring inside of the cup tending to force it to its extended position.

6. In quick acting high pressure connections, the combination with a coupling head back piece, of a nipple turning in the center thereof, a leather washer in the bottom of the back piece, an outwardly extending interiorly threaded flange on said back piece, a coupling head front piece externally threaded and having a reduced annular flange thereon, a flexible cup member having the central aperture with the body portion adapted to coöperate with the inner portion of the coupling head front piece and a rib adapted to be squeezed against the leather washer by the flange on the coupling head front piece when it is screwed into position, a pair of metal washers resting against adjacent surfaces of the leather washer and the cup, respectively, and a helically coiled expanding spring interposed between said metal washers.

In witness whereof, I have hereunto set my hand and affixed my seal, this 30th day of December, A. D. 1919.

WALTER J. RUDOLPH. [L. S.]

Witness:
 JOHN HOWARD McELROY.